No. 624,828. Patented May 9, 1899.
A. LANTZKE.
FIREPROOFING MATERIAL.
(Application filed June 13, 1896.)
(No Model.)

Witnesses
A. W. Kurz
Richard J. Elliott

Albert Lantzke, Inventor
By Schreiter & Van Oderstine
Attorneys.

UNITED STATES PATENT OFFICE.

ALBERT LANTZKE, OF NEW YORK, N. Y., ASSIGNOR TO THE NEW YORK ASBESTOS MANUFACTURING COMPANY, OF SAME PLACE.

FIREPROOFING MATERIAL.

SPECIFICATION forming part of Letters Patent No. 624,828, dated May 9, 1899.

Application filed June 13, 1896. Serial No. 595,494. (No specimens.)

*To all whom it may concern:*

Be it known that I, ALBERT LANTZKE, a citizen of the United States, and a resident of New York, (Bath Beach,) county of Kings, and State of New York, have invented certain new and useful Improvements in Fireproofing Materials, of which the following is a full, clear, and exact specification.

Figure 1:
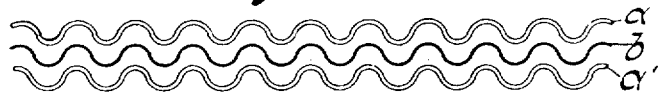
Figure 2:
Figure 3:
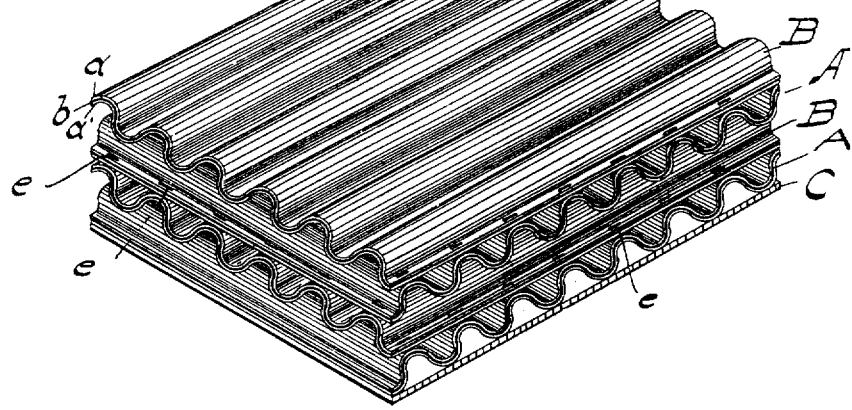
Figure 4:
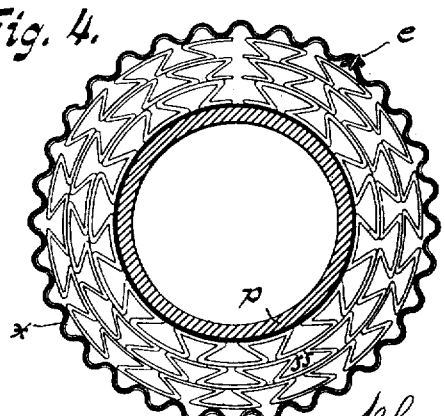

My invention relates to the manufacture of fireproofing materials; and it consists in the hereinafter-described construction of fireproof flexible lining or wrapping and of fireproofing building material composed of several layers of such fireproof flexible sheets.
In the accompanying drawings, Figure 1 is a sectional view of the material used in the construction of my improved fireproofing-sheets. Fig. 2 is a sectional view of a fireproofing-sheet. Fig. 3 is a perspective view of my improved fireproofing building material, and Fig. 4 is a sectional view of a non-conductive pipe-covering inclosed in a jacket or wrapper of my improved fireproofing-sheet.

In fireproofing of buildings not originally constructed as fireproof the architects resort to lining the walls and ceilings with asbestos millboard, because of the inability of the structural parts of such buildings to sustain the considerable additional weight that would be imposed on them by a solid fireproofing construction. Asbestos millboard is composed to a considerable extent (forty to sixty per cent.) of burnt clay or some similar material, which must be mixed with asbestos fiber to combine it into a compact mass. The construction of such linings is also very laborious on account of the brittleness of the millboard and the limited size of the sheets. Heat destroys the adhesiveness of the component parts of asbestos millboard, and consequently in case of fire it disintegrates and a lining constructed thereof is rendered ineffective.

Asbestos is a reliable fireproofing material;
but in order to make it applicable for the purpose it is necessary to combine it with some other material that will uphold the structure. Having found from tests and experience that a combination of asbestos with such material as used in asbestos millboard will not answer this purpose, I combine it with material more suitable for the purpose and in such manner that its fire-resistive quality is fully utilized, and the product, while comparatively very light, is of sufficient tensile strength, rendering it suitable as fireproofing-linings and also as material for construction of fireproof partition-walls.

Pure asbestos material produced in very thin sheets containing besides asbestos fibers only a very small quantity of non-combustible chemicals binding the fibers together, but not affecting their flexibility, is absolutely fireproof and will not disintegrate when exposed to fire. To render this material suitable for the explained purpose, I combine it with other material (which I call "structural filling") which may or may not be fireproof, but must, however, be capable of imparting to the composite sheet the requisite tensile strength and structural rigidity. The structural filling or core (indicated by letter $b$ in the drawings) is made of some fibrous material of sufficient consistency or tensile strength—as, for instance, some loosely-woven fabric, like cheesecloth, jute, vegetable or asbestos paper, or any other equivalent thereof—which before being joined with the sheets of asbestos is saturated by a non-combustible hardening solution, preferably silicate of soda. The solution when hardened imparts to the previously soft and pliable material the requisite structural rigidity to resist pressure and serves also as binding medium uniting the outer asbestos layers to this core.

I prefer to apply the asbestos sheets $a$ and $a'$ to both sides of the structural filling $b$, though for several purposes this may not be necessary. The composite sheet is passed through heated rollers, compressing the layers together and at the same time corrugating the composite sheet, which when finished is rigid in the direction of the corrugation, but flexible in the other direction. The finished composite sheets are then adapted as fireproofing-linings for walls and also as jackets for non-conductive coverings on pipes and boilers. Their fire-resisting quality is so great that a single layer of such material will effectively prevent the spread of fire through partitions lined therewith and protect woodwork in ceilings of rooms or apartments for a considerable length of time.

The fireproofing-sheets have a comparatively smooth surface capable of receiving a finish for decorative purposes or suitable waterproof coating. This will be found expedient for many purposes, especially where the fireproofing-sheets are to be used as jackets for non-conductive covering or as lining for ceilings or walls in kitchens, factories, and the like. The fireproofing-sheets are also used for making of building material for absolutely fireproof walls or partitions and exposed ceilings. Such building material is composed of several layers of the composite fireproofing-sheets, which are interposed crosswise, as shown in Fig. 3, the corrugations of the layers A being then at right angles to the corrugations of the layers B. The several layers are secured together by wire fasteners e, set in the joining-points of the layers. When an even surface is required, I secure to the outside of the first layer a flat sheet C of the same material, a thin layer of plastic material—for instance, plaster-of-paris or cement—which is applied to the outside of the top layer to fill in the corrugations and even its surface, or a sheet of thin asbestos millboard. This sheet of millboard before being secured to the layer A is first treated with silicate of soda to render its surface more compact and capable of receiving a finish. The fireproofing material is produced either in blocks of uniform size adapted for use in similar manner as tiles for linings, or as hollow building-blocks, or in large sheets, and in any thickness, as may be required.

The fireproofing building material is comparatively very light and therefore suitable for fireproofing and for constructive purposes in such buildings where this would be otherwise impossible without strengthening the supporting structure. Partitions or walls constructed wholly of such material are not only self-sustaining, but also capable of bearing such weight and strains as may properly be imposed on an inner wall in a building.

By the described construction of this fireproofing building material the non-conductive and protective quality of asbestos is reinforced by the non-conductivity of air inclosed within the body of the material, and it will be therefore apparent to all familiar with the art that a partition or lining constructed of such material will be very effective in protection against spread of fire. Such partitions are also absolutely sound-proof.

I claim as my invention and desire to secure by Letters Patent—

1. A fireproofing-sheet, composed of a rigid core of permeable fabric, saturated with an incombustible hardening solution, and of two layers of incombustible material secured thereto by the incombustible hardening solution.

2. A fireproofing-sheet composed of one layer of fibrous fabric, saturated with an incombustible hardening solution, and of two layers of asbestos material cemented, one on each side, to the layer of fibrous fabric and firmly compressed together with the inner layer.

3. A composite fireproofing-sheet consisting of a sheet of permeable material saturated with an incombustible and hardening solution, and of sheets of pure or nearly pure asbestos fabric covering the permeable material and united thereto by the incombustible hardening solution rendering the composite sheet structurally rigid.

4. A composite fireproofing-sheet consisting of an inner layer of incombustible fabric, permeated by an incombustible hardening solution, and of outer layers of pliable incombustible material cemented to the inner layer by the incombustible hardening solution filling the inner layer.

5. A composite fireproofing-sheet, composed of three layers of incombustible fabric, united by an incombustible hardening solution, saturating the inner layer, and corrugated.

6. A fireproofing material composed of crosswise interposed, corrugated composite sheets, each sheet consisting of an inner layer of permeable fabric saturated with an incombustible hardening solution, and of outer layers of pure or nearly pure asbestos material, united by the incombustible hardening solution filling the inner layer.

7. A fireproofing building-block composed of crosswise interposed layers of corrugated composite fireproofing-sheets, each sheet consisting of three layers of incombustible fabric, united by an incombustible hardening solution saturating the inner layer, and of a flat layer of non-combustible material applied on the surface of the block.

In witness that I claim the improvements described in the foregoing specification I have signed my name in the presence of two subscribing witnesses.

ALBERT LANTZKE.

Witnesses:
RICHARD I. ELLIOTT,
A. W. KURZ.